US012519253B2

(12) United States Patent
Wang et al.

(10) Patent No.: US 12,519,253 B2
(45) Date of Patent: Jan. 6, 2026

(54) ANTENNA SYSTEM, METHOD, AND WIRELESS COMMUNICATION DEVICE

(71) Applicant: Honor Device Co., Ltd., Shenzhen (CN)

(72) Inventors: Yi Wang, Shenzhen (CN); Yuan Xu, Shenzhen (CN); Ziyan Zhang, Shenzhen (CN); Kunpeng Wei, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 355 days.

(21) Appl. No.: 18/032,053

(22) PCT Filed: Dec. 21, 2022

(86) PCT No.: PCT/CN2022/140644
§ 371 (c)(1),
(2) Date: Apr. 14, 2023

(87) PCT Pub. No.: WO2023/169044
PCT Pub. Date: Sep. 14, 2023

(65) Prior Publication Data
US 2024/0372273 A1 Nov. 7, 2024

(30) Foreign Application Priority Data
Mar. 10, 2022 (CN) .................... 202210240268.7

(51) Int. Cl.
*H01Q 21/30* (2006.01)
*H01Q 9/42* (2006.01)
*H04B 1/401* (2015.01)

(52) U.S. Cl.
CPC .............. *H01Q 21/30* (2013.01); *H01Q 9/42* (2013.01); *H04B 1/401* (2013.01)

(58) Field of Classification Search
CPC ...... H04B 1/0064; H04B 1/0458; H04B 1/72; H01Q 21/30; H01Q 15/002; H01Q 15/006

See application file for complete search history.

(56) References Cited

U.S. PATENT DOCUMENTS

| 9,979,080 B2 | 5/2018 | Van Bezooijen et al. |
| 2006/0166635 A1 | 7/2006 | Kitayama et al. |

(Continued)

FOREIGN PATENT DOCUMENTS

| CN | 102577190 A | 7/2012 |
| CN | 105656508 A | 6/2016 |

(Continued)

*Primary Examiner* — Wen W Huang
(74) *Attorney, Agent, or Firm* — Leydig, Voit & Mayer, Ltd.

(57) ABSTRACT

This application provides an antenna system related to the field of terminal technologies. The system includes: a radio frequency chip, a controller, and a plurality of antennas, where the radio frequency chip is connected to the plurality of antennas: a first antenna, a second antenna, ..., and an Nth antenna by a power amplifier and switches, where the first antenna is a to-be-improved antenna, an ith antenna is an auxiliary antenna; and the controller determines that a frequency band in which an antenna of the wireless communication device operates belongs to a preset to-be-improved frequency band of the first antenna; determines whether the ith antenna operates; and sets a load status of a radio frequency input end of the ith antenna and adjusts a switch or Tuner state on the ith antenna side when the ith antenna does not operate.

15 Claims, 14 Drawing Sheets

(56) References Cited

U.S. PATENT DOCUMENTS

| | | | |
|---|---|---|---|
| 2010/0194647 A1* | 8/2010 | Man | H01Q 21/30 |
| | | | 343/702 |
| 2012/0206304 A1 | 8/2012 | Clow et al. | |
| 2013/0122824 A1* | 5/2013 | Schell | H04B 1/0064 |
| | | | 455/73 |
| 2015/0180514 A1* | 6/2015 | Pavacic | H04B 1/0064 |
| | | | 455/552.1 |
| 2015/0304000 A1* | 10/2015 | Wloczysiak | H04B 1/44 |
| | | | 455/78 |
| 2016/0190690 A1* | 6/2016 | Badran | H01Q 1/243 |
| | | | 343/750 |
| 2017/0070246 A1* | 3/2017 | Natesan | H04B 1/0458 |
| 2017/0126257 A1 | 5/2017 | Wang et al. | |
| 2017/0357961 A1 | 12/2017 | Bidari et al. | |
| 2021/0282206 A1* | 9/2021 | Zhu | H04L 5/0023 |
| 2023/0403036 A1 | 12/2023 | Shi et al. | |

FOREIGN PATENT DOCUMENTS

| | | |
|---|---|---|
| CN | 103887595 B | 8/2016 |
| CN | 107852180 A | 3/2018 |
| CN | 110289885 A | 9/2019 |
| CN | 111800159 A | 10/2020 |
| CN | 113131226 A | 7/2021 |
| CN | 113612498 A | 11/2021 |
| CN | 114069228 A | 2/2022 |
| CN | 215771542 U | 2/2022 |
| CN | 115064882 A | 9/2022 |
| WO | 2018014422 A1 | 1/2018 |

\* cited by examiner

ANTENNA SYSTEM, METHOD, AND WIRELESS COMMUNICATION DEVICE

CROSS-REFERENCE TO RELATED APPLICATIONS

This application is a national stage of International Application No. PCT/CN2022/140644, filed on Dec. 21, 2022, which claims priority to Chinese Patent Application No. 202210240268.7, filed on Mar. 10, 2022, both of which are hereby incorporated by reference in their entireties.

TECHNICAL FIELD

This application relates to the field of terminal device technologies, and in particular, to an antenna system, a method, and a wireless communication device.

BACKGROUND

With the continuous development of terminal devices, the terminal devices have increasingly high requirements for internal antennas, for example, antennas are required to be gradually miniaturized, and communication efficiency becomes increasingly high. Signals need to be sent and received through the antennas when the terminal devices make a call or access the Internet. However, after the antennas are miniaturized, radiators of the antennas are also reduced, resulting in a narrow frequency range covered by the antennas of the terminal devices.

With the development of mobile communication technologies and the advent of the 5th generation (5G) mobile communication system, the terminal devices have increasingly high requirements on multiple-input multiple-output (MIMO) antenna technologies. Currently, a 2*2 antenna system has gradually developed to a 4*4 antenna system, and a current mobile terminal generally needs to accommodate 8 to 15 function antennas with original Wi-Fi/GPS and the like.

As impact of electromagnetic radiation on a human body has attracted more and more attention and a standard of a specific absorption rate (SAR) is strict, existing terminal devices seriously affect external field communication in a case that a transmit power is limited.

Currently, under impact of full-screen display ultra-narrow frame ID, an antenna clearance of a terminal device is small (which is less than 1 mm), and a single antenna cannot cover a larger bandwidth when ensuring performance. The full-screen display ultra-narrow frame ID generally requires very high structure compactness. After a MIMO antenna is added, on one hand, space of an original communication antenna is compressed. On the other hand, a frequency band of the MIMO antenna is generally the same as a frequency band of the original communication antenna, resulting in deterioration of isolation of an antenna system. After the space of the antenna is compressed under a 5G system, available space of some antenna radiators is reduced by ⅓ or more, and a technical solution in which the SAR is reduced through shunting cannot be adopted, resulting in deterioration of the SAR, and finally OTA (Over The Air) and communication performance are affected, where the OTA represent a capability of antenna radiation and receiving an electromagnetic wave.

SUMMARY

To resolve the above problems, this application provides an antenna system, a method, and a wireless communication device, which can improve antenna performance, for example, improve a bandwidth and efficiency or reduce an SAR.

According to a first aspect, this application provides an antenna system, applicable to a wireless communication device, and including: a radio frequency chip, a controller, and a plurality of antennas, where the radio frequency chip is connected to the plurality of antennas by a power amplifier and switches; the plurality of antennas include: a first antenna, a second antenna, . . . , and an $N^{th}$ antenna, where N is an integer greater than or equal to 2; and the first antenna is a to-be-improved antenna, an $i^{th}$ antenna is an auxiliary antenna, and i is any one of 2 to N; and the controller is configured to determine that a frequency band in which an antenna of the wireless communication device operates belongs to a preset to-be-improved frequency band of the first antenna, where the preset to-be-improved frequency band includes at least one frequency band; determine whether the $i^{th}$ antenna operates; and set a load status of a radio frequency input end of the $i^{th}$ antenna and adjust a switch or Tuner state on the $i^{th}$ antenna side when the $i^{th}$ antenna does not operate, so that the $i^{th}$ antenna becomes the auxiliary antenna of the first antenna, where the load status of the radio frequency input end is set to any one of the following: open, broken, isolation, or ground.

In a possible implementation, when the wireless communication device includes a single card, that the controller is specifically configured to determine that the frequency band in which the antenna of the wireless communication device operates belongs to the preset to-be-improved frequency band specifically includes:
  determining that the single card performs communication in a single frequency band; and determining that the single frequency band of the single card of the wireless communication device belongs to one of the preset to-be-improved frequency band.

In a possible implementation, when the wireless communication device includes a single card, that the controller is specifically configured to determine that the frequency band in which the antenna of the wireless communication device operates belongs to the preset to-be-improved frequency band specifically includes:
  determining that the single card performs communication in a CA frequency band or an ENDC frequency band, and determining that the $i^{th}$ antenna does not operate in the CA frequency band or the ENDC frequency band; and
  determining that the CA frequency band or the ENDC frequency band of the single card belongs to the preset to-be-improved frequency band.

In a possible implementation, when the wireless communication device includes a dual card, that the controller is specifically configured to determine that the frequency band in which the antenna of the wireless communication device operates belongs to the preset to-be-improved frequency band specifically includes:
  determining, when the dual card is dual receive dual SIM dual standby, that both a primary card and a secondary card of the dual card perform communication in single frequency bands; and
  determining that both the single frequency band of the primary card and the single frequency band of the secondary card belong to the preset to-be-improved frequency band.

In a possible implementation, the controller is further configured to determine a MIMO operating state in a current operating frequency band to determine whether the $i^{th}$ antenna operates, and set the load status of the radio frequency input end of the $i^{th}$ antenna and adjust the switch or Tuner state on the $i^{th}$ antenna side when the $i^{th}$ antenna does not operate.

According to a second aspect, this application further provides a control method for an antenna system, applicable to an antenna system of a wireless communication device, where the antenna system includes: a radio frequency chip, a controller, and a plurality of antennas; the radio frequency chip is connected to the plurality of antennas by a power amplifier and switches; the plurality of antennas include: a first antenna, a second antenna, . . . , and an Nth antenna, where N is an integer greater than or equal to 2; and the first antenna is a to-be-improved antenna, an $i^{th}$ antenna is an auxiliary antenna, and i is any one of 2 to N; and the method includes: determining that a frequency band in which an antenna of the wireless communication device operates belongs to a preset to-be-improved frequency band of the first antenna, where the preset to-be-improved frequency band includes at least one frequency band; determining whether the $i^{th}$ antenna operates; and setting a load status of a radio frequency input end of the $i^{th}$ antenna and adjusting a switch or Tuner state on the $i^{th}$ antenna side when the $i^{th}$ antenna does not operate, so that the $i^{th}$ antenna becomes the auxiliary antenna of the first antenna, where the load status of the radio frequency input end is set to any one of the following: open, broken, isolation, or ground.

In a possible implementation, when the wireless communication device includes a single card, the determining that a frequency band in which an antenna of the wireless communication device operates belongs to a preset to-be-improved frequency band specifically includes: determining that the single card performs communication in a single frequency band; and determining that the single frequency band of the single card of the wireless communication device belongs to one of the preset to-be-improved frequency band.

In a possible implementation, when the wireless communication device includes a single card, the determining that a frequency band in which an antenna of the wireless communication device operates belongs to a preset to-be-improved frequency band specifically includes: determining that the single card performs communication in a CA frequency band or an ENDC frequency band, and determining that the $i^{th}$ antenna does not operate in the CA frequency band or the ENDC frequency band; and determining that the CA frequency band or the ENDC frequency band of the single card belongs to the preset to-be-improved frequency band.

In a possible implementation, when the wireless communication device includes a dual card, the determining that a frequency band in which an antenna of the wireless communication device operates belongs to a preset to-be-improved frequency band specifically includes: determining, when the dual card is dual receive dual SIM dual standby, that both a primary card and a secondary card of the dual card perform communication in single frequency bands; and determining that both the single frequency band of the primary card and the single frequency band of the secondary card belong to the preset to-be-improved frequency band.

In a possible implementation, the determining whether the $i^{th}$ antenna operates specifically includes: determining a MIMO operating state of the $i^{th}$ antenna in a current operating frequency band to determine whether the $i^{th}$ antenna operates, and setting the load status of the radio frequency input end of the $i^{th}$ antenna and adjusting the switch or Tuner state on the $i^{th}$ antenna side when the $i^{th}$ antenna does not operate.

According to a third aspect, this application provides a wireless communication device, including an antenna system and further including: a SIM card, where the SIM card is a single card or a dual card; and the SIM card sends and receives signals through the antenna system during communication.

The technical solutions provided in this application have at least the following advantages.

In the antenna system, the controller first determines a frequency band in which an antenna of a wireless communication device currently operates, that is, needs to determine, for regardless of a single-card device or a dual-card device, whether a communication frequency band is a frequency band included in a preset to-be-improved frequency band, and further determines whether an $i^{th}$ antenna operates if the frequency band in which the antenna currently operates belongs to the preset to-be-improved frequency band, and if the $i^{th}$ antenna does not operate, the $i^{th}$ antenna may be used as an auxiliary antenna, that is, the $i^{th}$ antenna is idle in the preset to-be-improved frequency band. Specifically, the controller can set a load status of the $i^{th}$ antenna to implement auxiliary work, where the load status may be adjusted as open, isolation, or ground. Conventionally, there is no technical solution in which the $i^{th}$ antenna is set to the auxiliary antenna. For example, when a first antenna operates, the remaining antennas do not perform any control. Because the $i^{th}$ antenna operates as the auxiliary antenna of the first antenna, that is, a radiator of the $i^{th}$ antenna may be used as a part of a radiator of the first antenna, a volume of the first antenna can be increased, and a bandwidth of the first antenna is increased. In addition, when the $i^{th}$ antenna is used as the auxiliary antenna of the first antenna, the $i^{th}$ antenna becomes a part of the first antenna, and there is no problem of isolation between the first antenna and the $i^{th}$ antenna.

DESCRIPTION OF EMBODIMENTS

To make a person skilled in the art more clearly understand solutions provided in this application, application scenarios of the technical solutions in this application are first introduced below.

Embodiments of this application do not specifically limit an application scenario of a multiple-antenna system. In some possible embodiments, the multiple-antenna system is applicable to a wireless communication device, and the wireless communication device includes, but not limited to, a mobile phone, a tablet computer, a desktop computer, a laptop computer, a notebook computer, an ultra-mobile personal computer (UMPC), a handheld computer, a netbook, a personal digital assistant (PDA), a wearable mobile terminal, and a smart watch.

Figure 1:
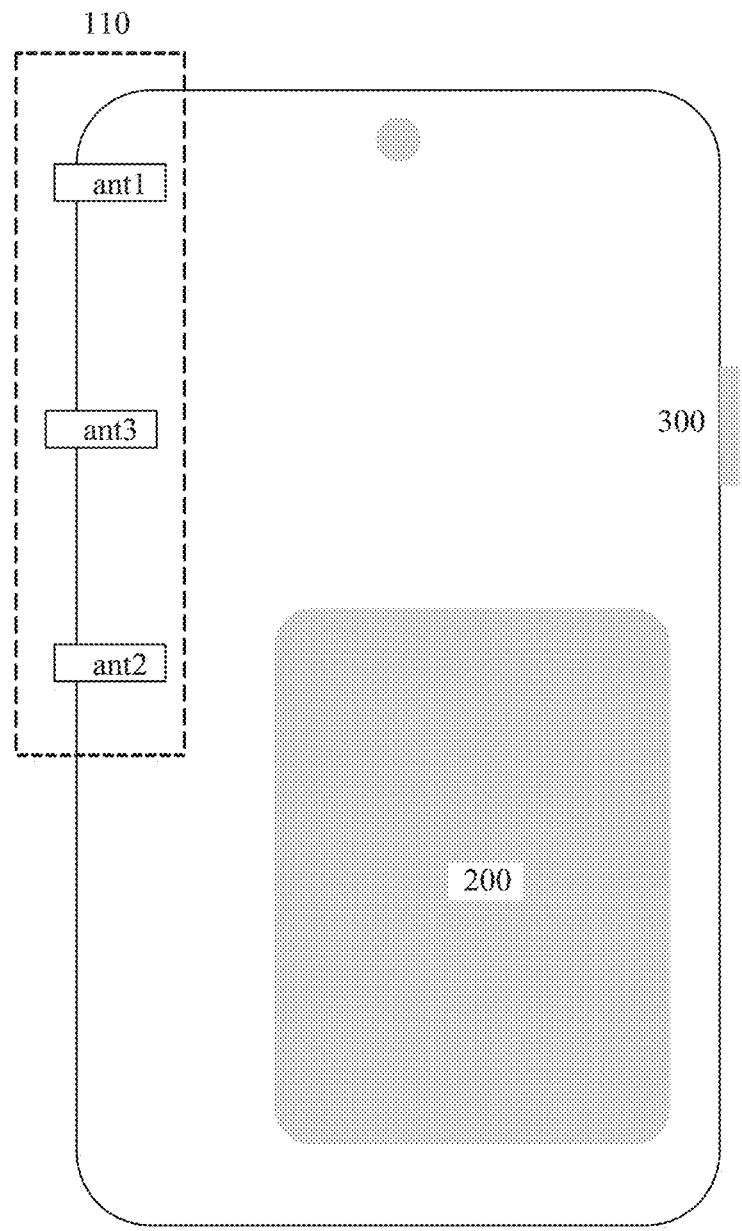
FIG. 1 is a schematic diagram of a wireless communication device according to an embodiment of this application.

For ease of understanding, FIG. 1 is a schematic diagram of a mobile phone in which a multiple-antenna system is used.

FIG. 1 is a schematic diagram of a wireless communication device according to an embodiment of this application.

As shown in FIG. 1, the mobile phone includes a multiple-antenna system 110, a battery 200, and a side button 300. In this embodiment, a description is made by using an example in which the antenna system includes three antennas.

The multiple-antenna system 110 includes a first antenna ant1, a second antenna ant2, and a third antenna ant3 that are disposed at a location of a side frame of a wireless communication device (for example, a mobile phone). The battery 200 is configured to supply power to the mobile phone. The side button 300 is configured for the mobile phone to receive an instruction from a user, for example, the user can long press the side button 300 to turn on or off the mobile phone and the like.

An internal architecture of the wireless communication device is described below with reference to the accompanying drawings.

Figure 2:
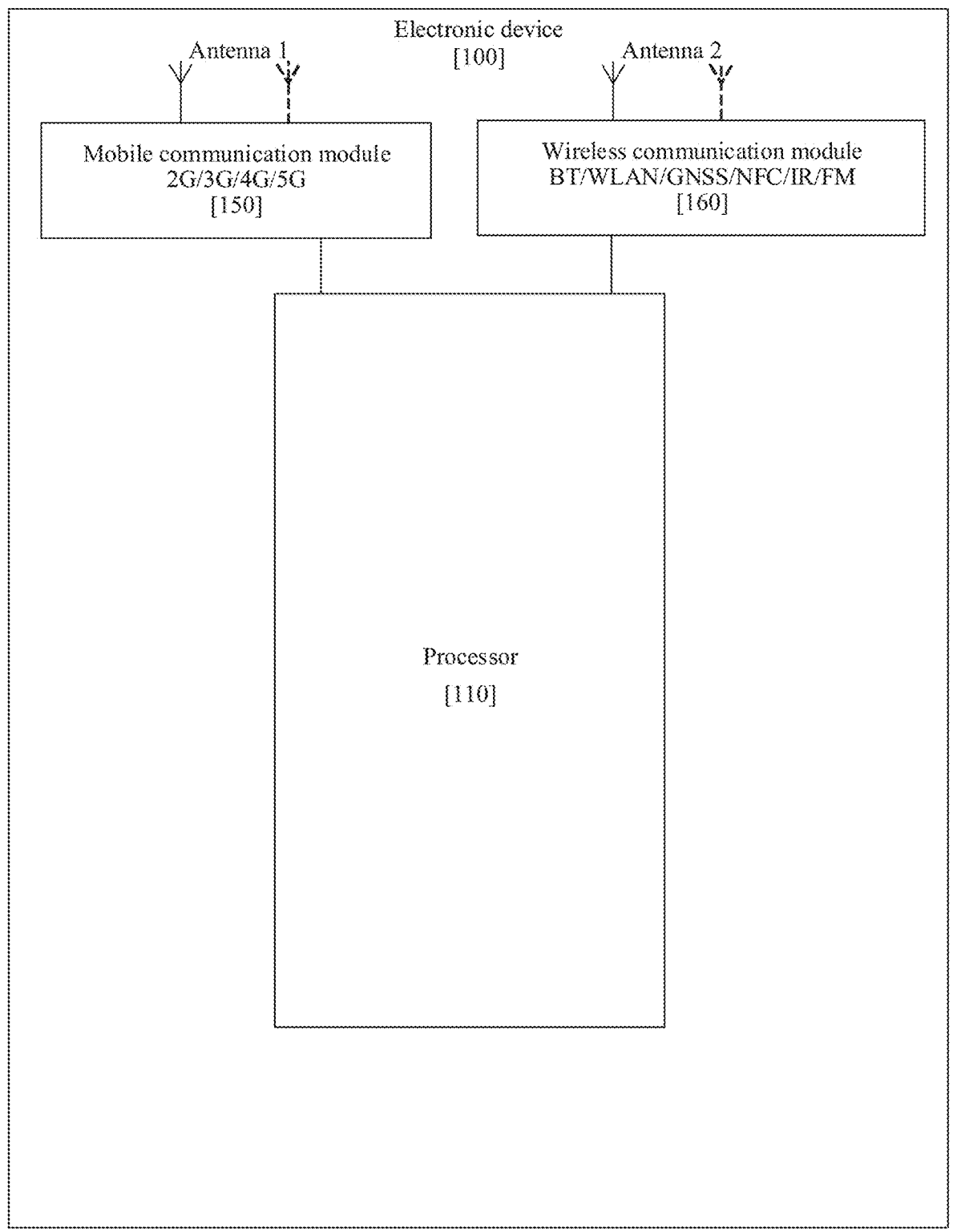
FIG. 2 is an architectural diagram of a wireless communication device according to an embodiment of this application.

FIG. 2 is an architectural diagram of a wireless communication device according to an embodiment of this application.

An electronic device 100 may include a processor 110. The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be separate devices or may be integrated into one or more processors.

The controller may generate an operation control signal based on an instruction operation code and a timing signal, and read an instruction and control execution of the instruction.

A memory may be further configured in the processor 110, to store an instruction and data. In some embodiments, the memory in the processor 110 is a cache. The memory may store an instruction or data that has just been used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

A wireless communication module 160 may provide a solution for wireless communication including a wireless local area network (WLAN) (for example, a wireless fidelity (Wi-Fi) network), Bluetooth (BT), and a global navigation satellite system (GNSS), frequency modulation (FM), a near field communication (NFC) technology, an infrared (IR) technology, and the like to be applied to the electronic device 100. The wireless communication module 160 may be one or more devices integrating at least one communication processing module. The wireless communication module 160 receives an electromagnetic wave by using an antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using an antenna 2.

In some embodiments, in the electronic device 100, an antenna 1 is coupled to a mobile communication module 150, and the antenna 2 is coupled to the wireless communication module 160, so that the electronic device 100 may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, GNSS, WLAN, NFC, FM, and/or IR technologies, and the like. The GNSS may include a global positioning system (GPS), a global navigation satellite system (GLONASS), and a Beidou navigation satellite system (BDS), a quasi-zenith satellite system (QZSS) and/or a satellite based augmentation system (SBAS).

Antenna System Embodiment

To improve performance of an antenna system disposed below a narrow bezel of a wireless communication device and enable an SAR to meet a requirement, the following describes an implementation of the antenna system provided in this application.

Figure 3:
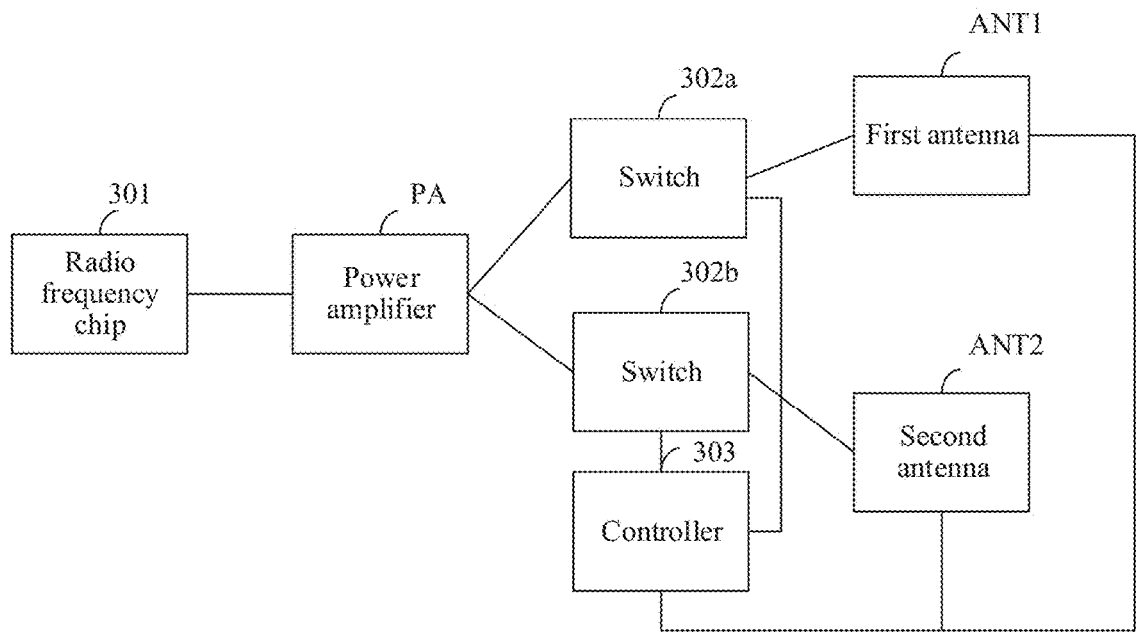
FIG. 3 is an architectural diagram of an antenna system according to an embodiment of this application.

FIG. 3 is an architectural diagram of an antenna system according to an embodiment of this application.

This embodiment provides an antenna system, applicable to a wireless communication device, and including: a radio frequency chip 301, a controller 304, and a plurality of antennas. The radio frequency chip 301 is connected to the plurality of antennas by a power amplifier PA and switches 302a and 302b. The plurality of antennas include: a first antenna, a second antenna, ..., and an $N^{th}$ antenna, where N is an integer greater than or equal to 2. Only two antennas are schematically drawn in the figure, for example, a first antenna ANT1 and a second antenna ANT2. The first antenna ANT1 is a to-be-improved antenna, an $i^{th}$ antenna is an auxiliary antenna, and i is any one of 2 to N. For example, when N=4, the $i^{th}$ antenna may be a second antenna, or may be a third antenna, or may be a fourth antenna. The first antenna ANT1 is connected to the power amplifier PA by the switch 302a, and the second antenna ANT2 is connected to the power amplifier PA by the switch 302b. It should be understood that the plurality of antennas may correspond to a plurality of switches, and each antenna is connected to a corresponding switch. In addition, the plurality of antennas may share one power amplifier or the plurality of antennas may respectively correspond to different power amplifiers. This is not specifically limited in this embodiment of this application.

It should be understood that a quantity of auxiliary antennas is not limited in this embodiment of this application, for example, there may be one or two or more auxiliary antennas. An antenna may operate as the auxiliary antenna provided that the antenna does not operate and meets a condition for being the auxiliary antenna.

The controller 303 is configured to determine that a frequency band in which an antenna of the wireless communication device operates belongs to a preset to-be-improved frequency band of the first antenna ANT1, where the preset to-be-improved frequency band includes at least one frequency band. It should be understood that the preset to-be-improved frequency band may include one or more frequency bands, which specifically relates to a communication standard of the wireless communication device.

The controller is configured to determine whether the $i^{th}$ antenna operates; and set a load status of a radio frequency input end of the $i^{th}$ antenna and adjust a switch or Tuner state of the $i^{th}$ antenna when the $i^{th}$ antenna does not operate, so that the $i^{th}$ antenna becomes the auxiliary antenna of the first antenna ANT1, that is, synchronous tuning needs to be performed on the $i^{th}$ antenna, where the load status of the radio frequency input end is set to any one of the following: open (Open), broken, isolation (Isolation), or ground (GND).

In the antenna system provided in this embodiment of this application, the controller first determines a frequency band in which an antenna of a wireless communication device currently operates, that is, needs to determine, for regardless of a single-card device or a dual-card device, whether a communication frequency band is a frequency band included in a preset to-be-improved frequency band, and further determines whether an $i^{th}$ antenna operates if the frequency band in which the antenna currently operates belongs to the preset to-be-improved frequency band, and if the $i^{th}$ antenna does not operate, the $i^{th}$ antenna may be used as an auxiliary antenna, that is, the $i^{th}$ antenna is idle in the preset to-be-improved frequency band. Specifically, the controller can set a load status of the $i^{th}$ antenna to implement auxiliary work, where the load status may be adjusted as open, isolation, or ground. Conventionally, there is no technical solution in which the $i^{th}$ antenna is set to the auxiliary antenna. For example, when a first antenna operates, the remaining antennas do not perform any control. Because the $i^{th}$ antenna operates as the auxiliary antenna of the first antenna, that is, a radiator of the $i^{th}$ antenna may be used as a part of a radiator of the first antenna, a volume of the first antenna can be increased, and a bandwidth of the first antenna is increased. In addition, when the $i^{th}$ antenna is used as the auxiliary antenna of the first antenna, the $i^t$h antenna becomes a part of the first antenna, and there is no problem of isolation between the first antenna and the $i^{th}$ antenna.

Figure 4:
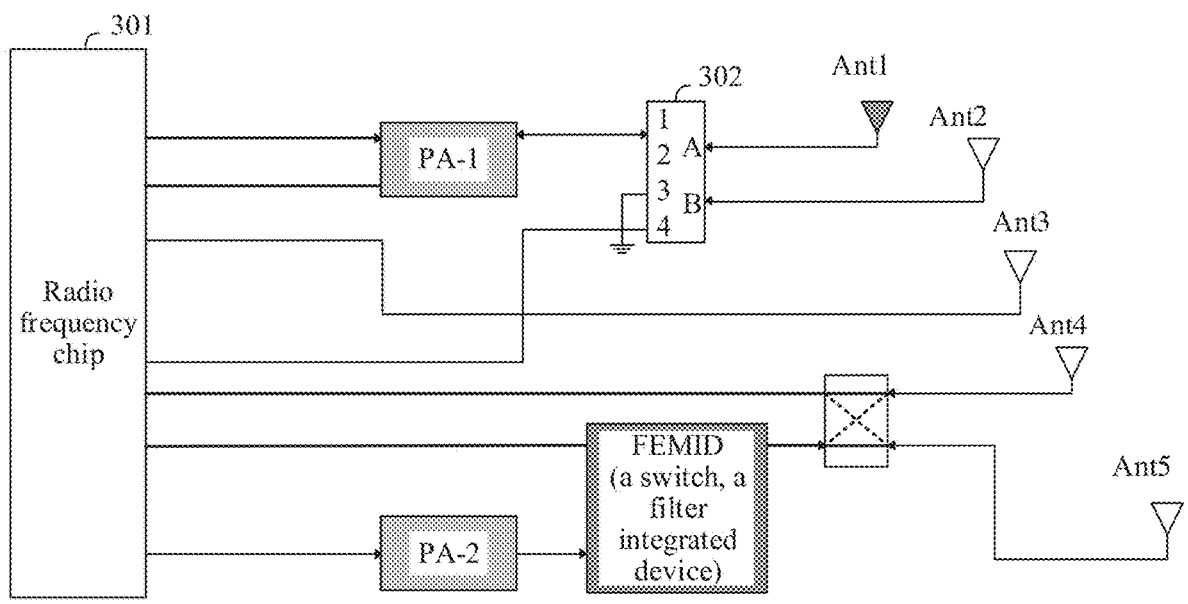
FIG. 4 is a schematic diagram of an antenna system according to an embodiment of this application.

FIG. 4 is a schematic diagram of an antenna system according to an embodiment of this application.

In this embodiment, a description is made by using an example in which the antenna system includes five antennas, that is, a first antenna Ant1, a second antenna Ant2, a third antenna Ant3, a fourth antenna Ant4, and a fifth antenna Ant5.

In this embodiment, the first antenna Ant1 is a to-be-improved antenna, and the second antenna Ant2 is an auxiliary antenna. The second antenna Ant2 operates in other frequency bands, and the first antenna Ant1 and the second antenna Ant2 are connected to the radio frequency chip 301 by a switch 302 and a power amplifier PA-1.

When a port 1 of the switch 302 is connected to A, that is, when the first antenna Ant1 is connected to the radio frequency chip 301, a radio frequency path of the first antenna Ant1 is in a load operating state.

When a port 4 of the switch 302 is connected to B, that is, when the second antenna Ant2 is connected to the radio frequency chip 301, a radio frequency path of the second antenna Ant2 is in a load operating state.

When the second antenna Ant2 needs to be used as an auxiliary antenna of the first antenna Ant1, a port 2 (in an open state) or a port 3 (in a GND-short circuit state) of the switch 302 may be controlled to connect to the port B, that is, the port 2 of the switch 302 is in the open state, and the port 3 is in the short circuit state. That is, a load status of an input end of the second antenna Ant2 is open or ground. Certainly, the load status of the input end of the second antenna Ant2 may alternatively be controlled as isolation. Details are not described herein by using examples. If a path of the second antenna Ant2 further includes an antenna tuner such as a Switch or a Tuner, a matching status of the Switch or the Tuner of the second antenna Ant2 may be further synchronously adjusted, so that the second antenna Ant2 operates around an operating frequency band of the first antenna Ant1 that needs to be assisted.

A description is made below with reference to an antenna system of a mobile phone.

Figure 5:
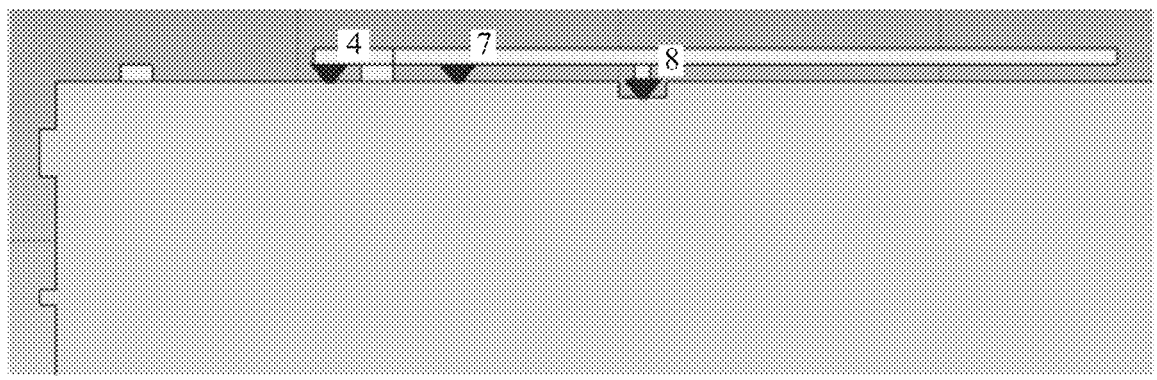
FIG. 5 is a structural diagram of another antenna system according to an embodiment of this application.

FIG. 5 is a structural diagram of another antenna system according to an embodiment of this application.

In this embodiment, a description is made by using an example of joint tuning of LB and n78 integrated dual-antenna radio frequency path.

As shown in FIG. 5, a pin 4 represents a first antenna, and the first antenna operates in a frequency band N78. A pin 7 represents a second antenna, and a pin 8 is connected to a switch. The pin 4 is a feed, the pin 7 is a low-frequency feedpoint, and a status of the pin 7 may be adjusted as open (Open) and a load (Load) state. For example, after it is recognized that a mobile phone is a single card or in a non-ENDC LB+N78 state, a radio frequency input end (that is, the pin 4) in an LB is switched to Open, and performance (a bandwidth and efficiency) in the N78 is improved by using a Switch of the LB antenna, that is, the second antenna is adjusted to be near a frequency of the first antenna.

To better describe the beneficial effect of the technical solution provided in this embodiment of this application, a difference of the antenna system before and after the second antenna is adjusted as the auxiliary antenna is described below by comparison.

Figure 6A:
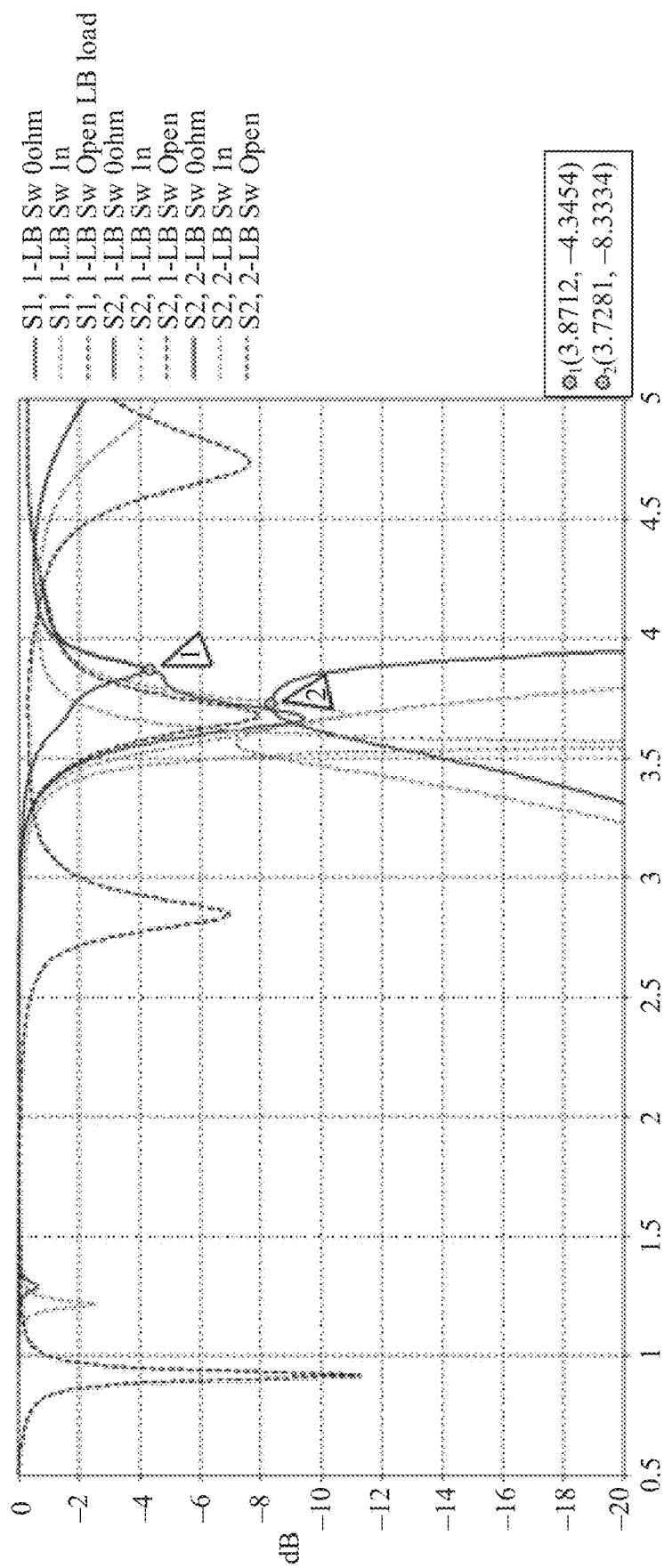
FIG. 6A, corresponding to FIG. 5, is an effect diagram in which a load of an input end of a second antenna is not adjusted.

FIG. 6A, corresponding to FIG. 5, is an effect diagram in which a load of an input end of a second antenna is not adjusted.

The following describes an S11 and an S21 that are between an LB radio frequency end of a second auxiliary antenna and a first antenna in operation (that is, in a load state).

In a case that the LB is in the load state, a match (Match) of a switch on a low frequency side of the second antenna is tuned, a parasitic resonance can be formed between N78 and 3.8 GHz in a case of 0 ohm, and a bandwidth is increased. However, in this case, an isolation S21 between the first antenna and the second antenna is less than −10 dB, which does not meet a requirement.

Therefore, to enable the S21 to meet the requirement, the following describes an implementation provided in this embodiment of this application.

Figure 6B:
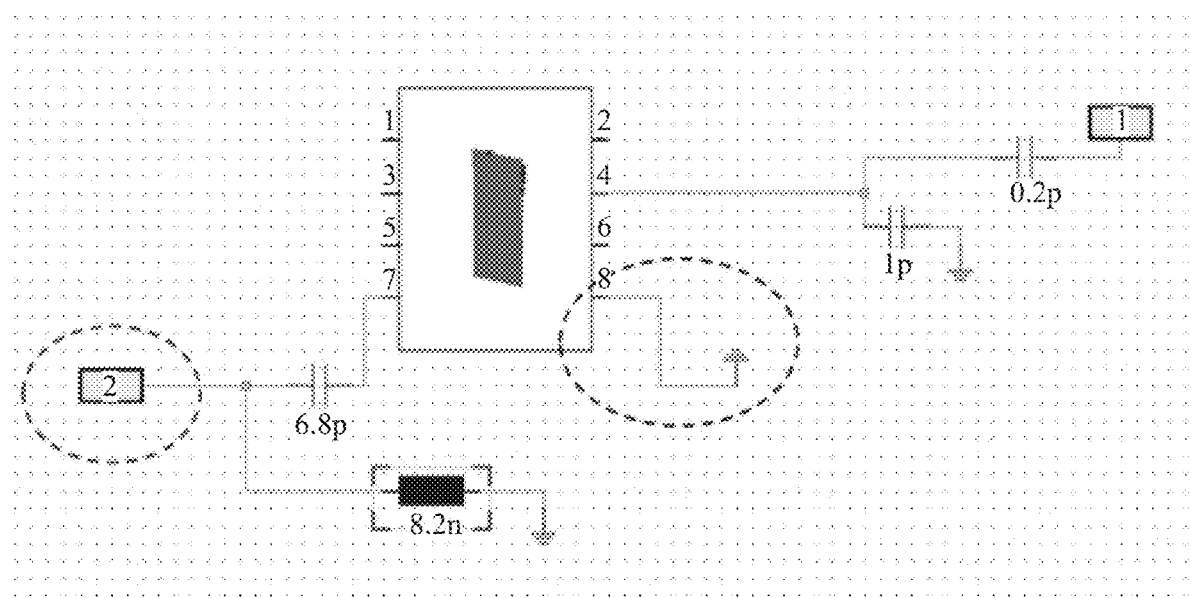
FIG. 6B is a schematic diagram of tuning of a radio frequency end of a second antenna according to an embodiment of this application.

FIG. 6B is a schematic diagram of tuning of a radio frequency end of a second antenna according to an embodiment of this application.

According to the technical solution provided in this embodiment, a Low Band antenna input end (a port 2) of the second antenna is adjusted as open, that is, Open (a load shown in the figure), and Matching (a port 8) of a Switch on a switch side of a tuned N78 integrated Low Band end is adjusted as ground. As shown in the figure, the pin 8 is grounded, so that a load status of an input end of the second antenna is changed, and the second antenna becomes the auxiliary antenna of the first antenna. Matching of an N78 source input end of the first antenna is not changed.

Figure 6C:
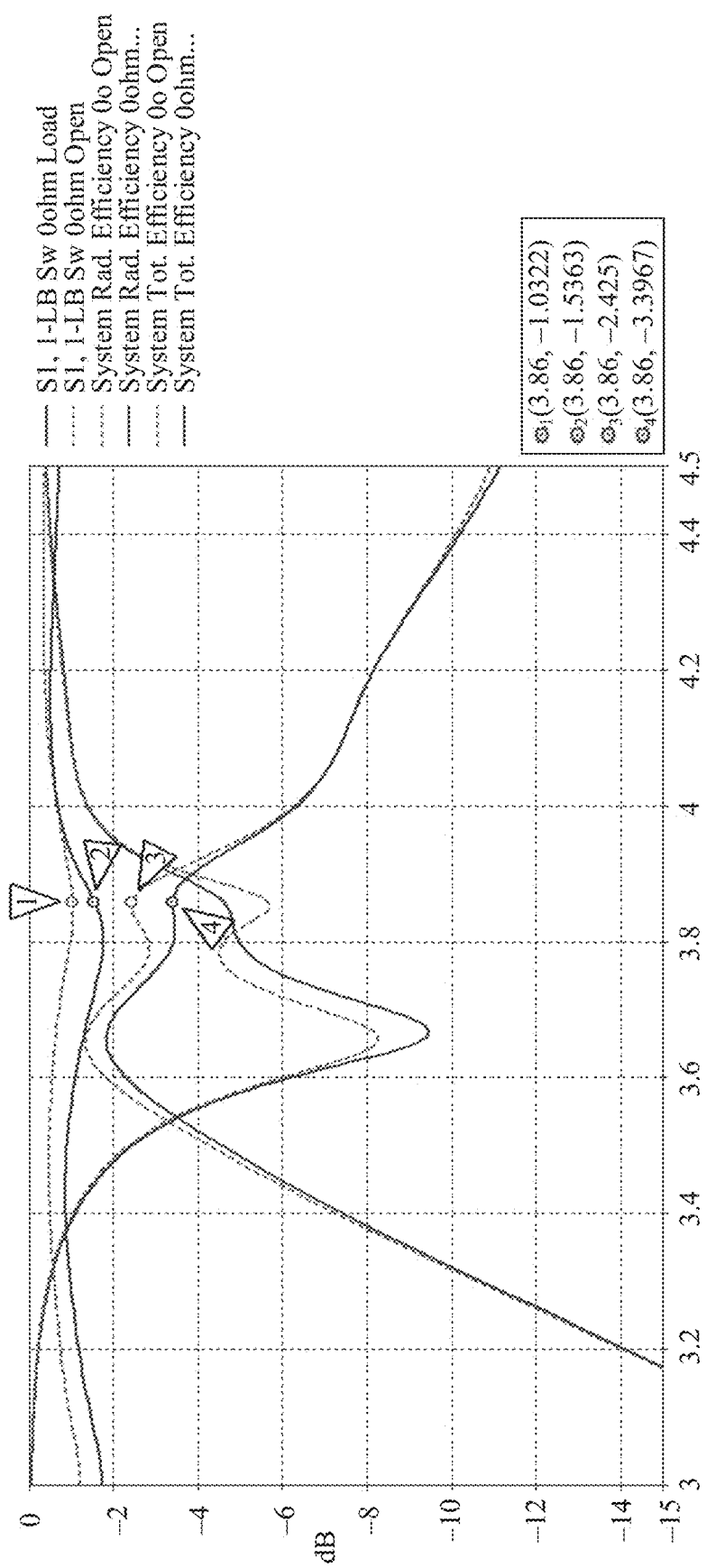
FIG. 6C, corresponding to FIG. 5, is an effect diagram in which a load of an input end of a second antenna is adjusted.

FIG. 6C, corresponding to FIG. 5, is an effect diagram in which a load of an input end of a second antenna is adjusted.

In a case that an input end of a Low Band second antenna is Open, both a bandwidth and efficiency of an N78 antenna are better than that of the Low Band antenna in a load state, and efficiency of the antenna system is improved by about 1 dB, and there is no problem of isolation between the first antenna and the second antenna.

In a case that the input end of the Low Band second antenna is Open, an antenna switch on an LB side may be further adjusted to switch different Matching (an inductance, a capacitance, 0 ohm), and an auxiliary antenna is adjusted to produce different resonant frequencies, so that the bandwidth of the first antenna in the N78 frequency band is widened.

Figure 7:
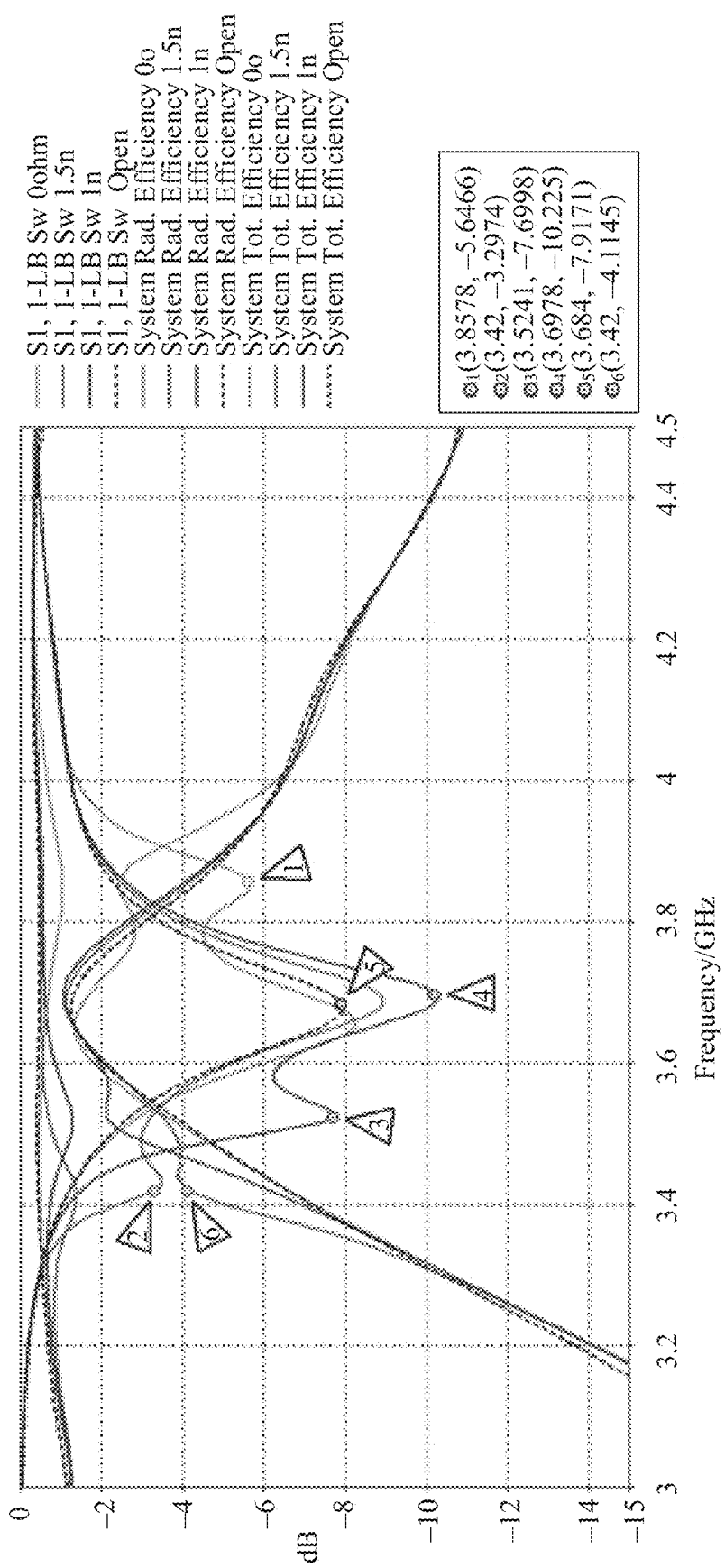
FIG. 7 is a schematic diagram of an S11 after different matching is debugged for a radio frequency end of a second antenna and a switch on an antenna side according to an embodiment of this application.

FIG. 7 is a schematic diagram of an S11 after different matching is debugged for a radio frequency end of a second antenna and a switch on an antenna side according to an embodiment of this application.

It can be seen from FIG. 7 that an antenna switch on an LB side is directly grounded, and a resonance position is different from a resonance position when the antenna switch is grounded through inductors of different inductances, so that different bandwidths can be adjusted, that is, different bandwidths are widened.

The implementation of the antenna system is described above, and the following describes an implementation of another antenna system.

A description is made by using an example in which a first antenna operates in a frequency band whose performance needs to be improved in a middle/high frequency band MHB (1.71 GHz to 2.7 GHz in 2G/3G/4G/5G), that is, a preset to-be-improved frequency band is (B1/B3/B7/B41 in an LTE communication standard and n1/n3/n7/n41 in an NR communication standard) in the MHB, and a second antenna (an auxiliary antenna) operates in a non-MHB frequency band.

| Communication standard | | MHB-Band (middle/high frequency band-1.71 to 2.7 GHz) | Band (frequency band) that needs to be improved for the antenna |
|---|---|---|---|
| 2G | GSM | B2/B3 | \ |
| 3G | WCDMA | B1 | \ |
| 4G | LTE | B1/B2/B3/B7/B34/B39/B41 | B1/B3/B7/B41 |
| 5G | NR | n1/n3/n7/n41 | n1/n3/n7/n41 |

For example, for a single-card 4G mobile phone, if a frequency band in which an antenna of the mobile phone operates is a B5, because the B5 does not belong to a to-be-improved frequency band, the single-card mobile phone operating in the B5 frequency band does not need to be adjusted, that is, an auxiliary antenna does not need to be set for the first antenna in operation. It should be understood that as shown in the table, if an antenna operates in a B1, a B3, or a B7, no auxiliary antenna needs to be set, and the frequency bands are not included in the to-be-improved frequency band.

Figure 8:
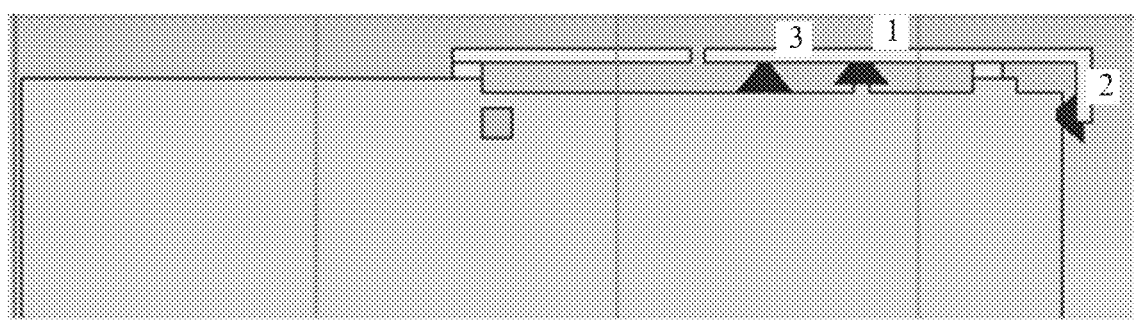
FIG. 8 is a schematic diagram of another antenna system according to an embodiment of this application.

FIG. 8 is a schematic diagram of another antenna system according to an embodiment of this application.

A pin 3 corresponds to an MHB feed, that is, a feedpoint, of a first antenna. A pin 2 corresponds to a feedpoint of a second antenna, a pin 1 is a switch tuning point, and a switch is connected to the pin 2 in parallel. The pin 2 may be adjusted as Open or Load. When the second antenna is used as an auxiliary antenna of the first antenna, the pin 2 may be adjusted to the Open state.

For example, after it is recognized that a mobile phone is in a single card MHB and non-ENDC (EUTRA NR Dual-Connectivity)/CA (Carrier Aggregation) first antenna and second antenna combined operating state, a radio frequency input end of the second antenna is set to Open, and MHB performance (a bandwidth and efficiency) is improved by tuning a Match of an antenna Switch, and an SAR is reduced. ENDC is one of 4G-LTE and 5G-NR dual connectivity operating mode and a 5G operating model. CA is a carrier aggregation technology, which means multi-frequency band dual connectivity operation.

When the second antenna is in a non-Load state, a load of an input end is tuned to open (Open), and the second antenna is used as an auxiliary antenna of the first antenna by tuning a switch and Matching of the second antenna, so that a bandwidth of an antenna in an original middle/high frequency band MHB can be widened, and a B7 frequency band can be covered. In addition, there is no problem of isolation between the second antenna and the first antenna, that is, the isolation meets the requirement.

Figure 9:
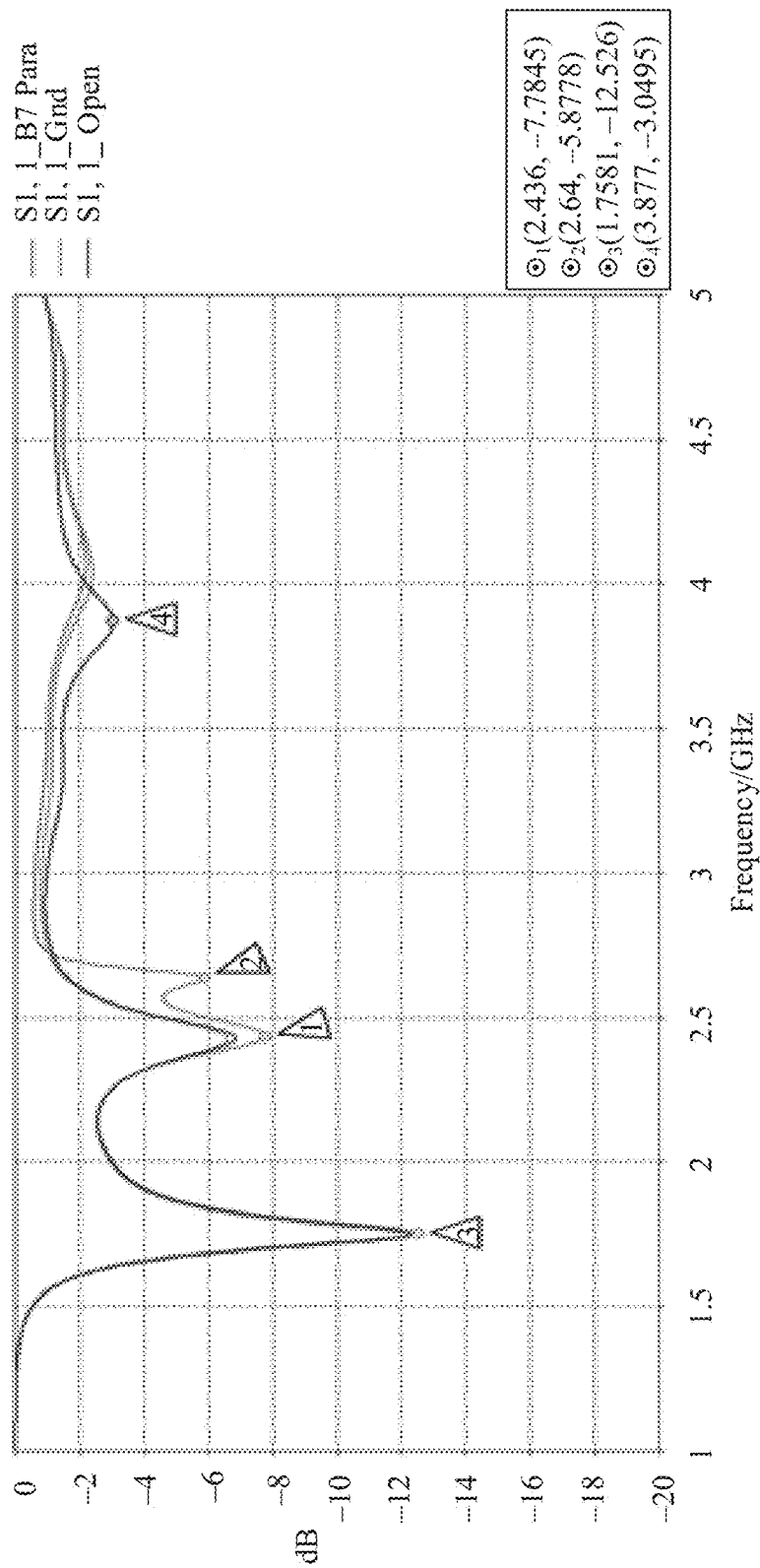
FIG. 9 is a comparison diagram of an S11 of a first antenna when a second antenna is in different states as an auxiliary antenna according to an embodiment of this application.

FIG. 9 is a comparison diagram of an S11 of a first antenna when a second antenna is in different states as an auxiliary antenna according to an embodiment of this application.

Three different curves are shown in FIG. 9, which are respectively an S11 when a radio frequency input end of the second antenna is adjusted into different states.

S11_Open (4 in the curve is a resonance position in the curve): an S11 of the first antenna when the radio frequency input end of the second antenna is set to Open and a switch is not tuned.

S11_GND (3 in the curve is a resonance position in the curve): an S11 of the first antenna when the radio frequency input end of the second antenna is set to GND and the switch is not tuned.

S11_B7 Para (both 1 and 2 in the curve are resonance positions in the curve): an S11 of the first antenna when the radio frequency input end of the second antenna is set to Open and the switch is tuned. It can be obviously seen that a bandwidth of the first antenna is widened, and there is an additional resonance, that is, 1 and 2 respectively represent two different resonance positions.

Figure 10:
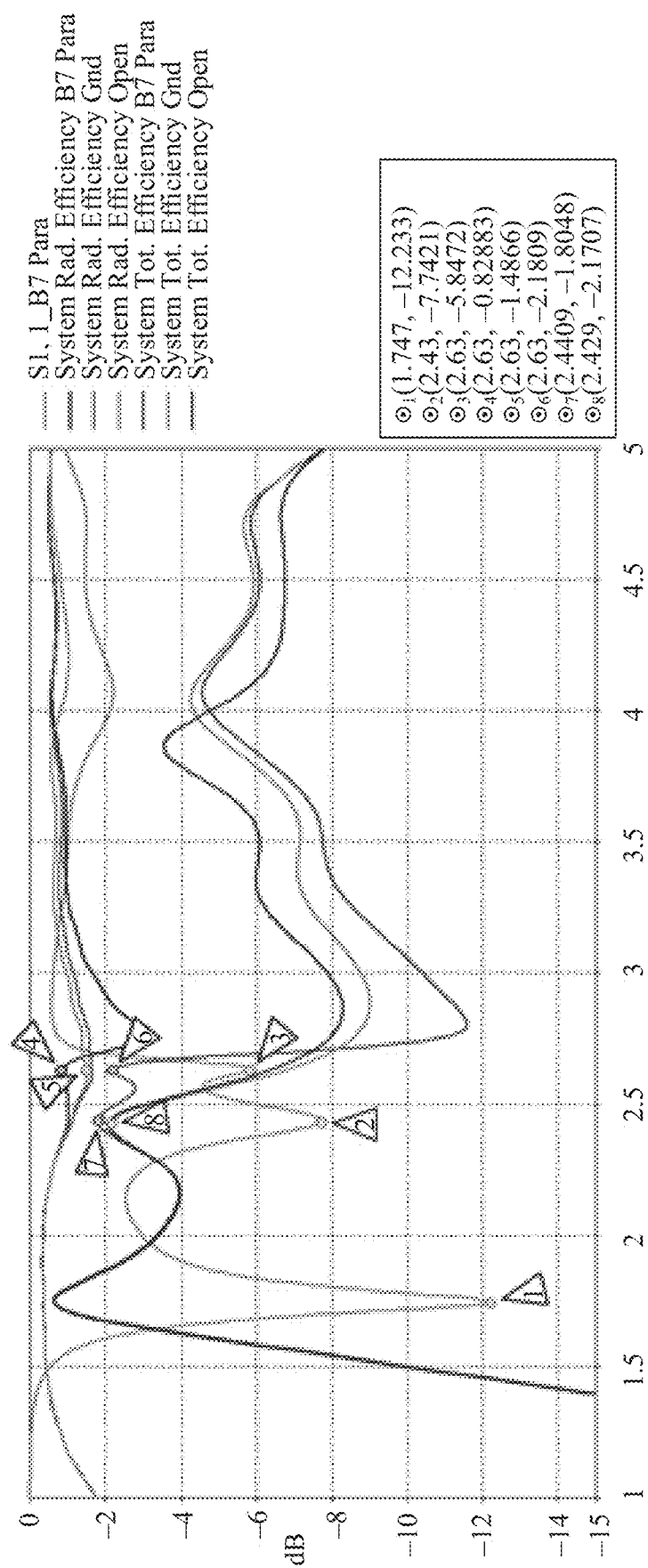
FIG. 10 is a comparison diagram of efficiency of a first antenna when a second antenna is in different states as an auxiliary antenna according to an embodiment of this application.

FIG. 10 is a comparison diagram of efficiency of a first antenna when a second antenna is in different states as an auxiliary antenna according to an embodiment of this application.

When the second antenna is in a non-Load state, the radio frequency input end is tuned to Open, and a switch and Matching of the second antenna are tuned, so that the second antenna is used as a parasitic auxiliary antenna, an original S11 bandwidth of the first antenna in the MHB can be widened, and antenna efficiency of the first antenna in the B7 frequency band can be improved by about 2 dB to 4 dB compared with original antenna efficiency.

According to the technical solution provided in this embodiment of this application, in addition to improving the S11 and the antenna efficiency, the B7 frequency band is at the top of the mobile phone, that is, an SAR on a Top surface is also reduced by about 45% compared with an original SAR. For specific data, refer to the following table.

| 24 dBm | Tot. Efficiency | | | Body Top 5 mm-(normalization TRP 19 dBm) | | |
|---|---|---|---|---|---|---|
| | Para-B7 | Open | Gnd | Para-B7 | Open | Gnd |
| B3-1747 MHz | −0.64 | −0.64 | −0.64 | 0.57 | 0.57 | 0.57 |
| B1-1950 MHz | −3.0 | −2.92 | −2.98 | 1.42 | 1.43 | 1.43 |
| B7-2535 MHz | −2.6 | −4.14 | −3.92 | 0.50 | 0.90 | 0.99 |

According to the antenna system provided in the embodiments of this application, when an auxiliary antenna is selected for a first antenna in operation, it is first determined whether a frequency band in which a wireless communication device is operating belongs to a preset to-be-improved frequency band, if the frequency band belongs to the preset to-be-improved frequency band, it is determined whether an $i^{th}$ antenna operates in the preset to-be-improved frequency band, if the $i^{th}$ antenna operates in the preset to-be-improved frequency band, the $i^{th}$ antenna cannot be used as the auxiliary antenna, and if the $i^{th}$ antenna does not operate in the preset to-be-improved frequency band, the $i^{th}$ antenna can be used as the auxiliary antenna.

A working principle of selecting an auxiliary antenna is described below from perspectives of a single-card wireless communication device and a dual-card wireless communication device.

First, a single card is described, that is, when the wireless communication device includes the single card, in the antenna system provided in the embodiments of this application, a specific implementation in which the controller determines the frequency band in which the antenna of the wireless communication device operates belongs to the preset to-be-improved frequency band includes: determining that the single card performs communication in a single frequency band; and determining that the single frequency band of the single card of the wireless communication device belongs to one of the preset to-be-improved frequency band. The preset to-be-improved frequency band may include one or more frequency bands.

When the wireless communication device includes the single card, a specific implementation in which the controller determines that the frequency band in which the antenna of the wireless communication device operates belongs to the preset to-be-improved frequency band includes: determining that the single card performs communication in a CA frequency band or an ENDC frequency band, and determining that the $i^{th}$ antenna does not operate in the CA frequency band or the ENDC frequency band; and determining that the CA frequency band or the ENDC frequency band of the single card belongs to the preset to-be-improved frequency band.

The following describes a dual card. When the wireless communication device includes the dual card, in the antenna system provided in the embodiments of this application, a specific implementation in which the controller determines the frequency band in which the antenna of the wireless communication device operates belongs to the preset to-be-improved frequency band includes: determining, when the dual card is dual receive dual SIM dual standby, that both a primary card and a secondary card of the dual card perform communication in single frequency bands; and determining that both the single frequency band of the primary card and the single frequency band of the secondary card belong to the preset to-be-improved frequency band. If the single frequency band in which one card of the dual card operates does not belong to the preset to-be-improved frequency band, the auxiliary antenna is not selected for the first antenna.

When the wireless communication device includes the dual card, in the antenna system provided in the embodiments, the controller is further configured to determine a MIMO operating state in a current operating frequency band to determine whether $i^{th}$ antenna operates, and set the load status of the radio frequency input end of the $i^{th}$ antenna and adjust the switch or Tuner state on the $i^{th}$ antenna side when the $i^{th}$ antenna does not operate, so that the $i^{th}$ antenna is used as the auxiliary antenna of the first antenna. It should be understood that if the $i^{th}$ antenna operates in 4*4MIMO, the $i^{th}$ antenna cannot be used as the auxiliary antenna. The $i^{th}$ antenna can be used as the auxiliary antenna when operating in 2*2MIMO, that is, when the $i^{th}$ antenna operates in 2*2MIMO, two antennas do not operate and are in an idle state, so that the $i^{th}$ antenna can be used as the auxiliary antenna.

According to the antenna system provided in the embodiments of this application, an auxiliary antenna can be adjusted for both a single-card wireless communication device and a dual-card wireless communication device, and the auxiliary antenna can be configured for a first antenna in operation, so that the auxiliary antenna becomes a part of the first antenna, and a bandwidth of the first antenna is widened. Because the auxiliary antenna does not operate in another frequency band, there is no problem of isolation between the auxiliary antenna and the first antenna, and the isolation between the two antennas meets the requirement.

In addition, the technical solution provided in the embodiments of this application can not only used for improving antenna performance in cellular communication, but also used for improving performance of a required cellular antenna by determining whether antennas such as GPS and Wi-Fi/BT antennas in the remaining communication standards operate, adjusting a load status of a radio frequency input end of the GPS or Wi-Fi antenna and using the GPS or Wi-Fi antenna as auxiliary of the cellular antenna.

Method Embodiment

Based on the antenna system provided in the foregoing embodiments, an embodiment of this application further provides a control method for an antenna system. A detailed description is made below with reference to the accompanying drawings.

Figure 11:
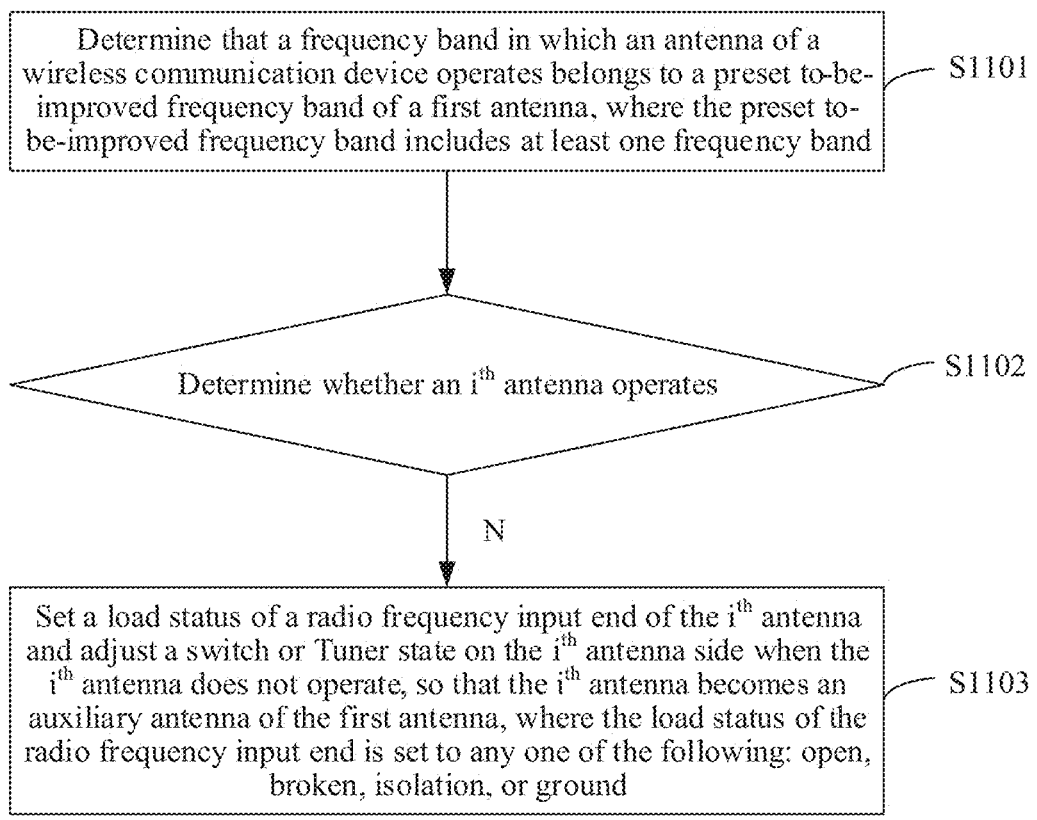
FIG. 11 is a flowchart of a control method for an antenna system according to an embodiment of this application.

FIG. 11 is a flowchart of a control method for an antenna system according to an embodiment of this application.

The control method for an antenna system provided in this embodiment is applicable to an antenna system of a wireless communication device, where the antenna system includes: a radio frequency chip, a controller, and a plurality of antennas. The radio frequency chip is connected to the plurality of antennas by a power amplifier and switches. The plurality of antennas include: a first antenna, a second antenna, . . . , and an Nth antenna, where N is an integer greater than or equal to 2. The first antenna is a to-be-improved antenna, an ith antenna is an auxiliary antenna, and i is any one of 2 to N.

The method includes the following steps.

S1101: Determine that a frequency band in which an antenna of the wireless communication device operates belongs to a preset to-be-improved frequency band of the first antenna, where the preset to-be-improved frequency band includes at least one frequency band.

S1102: Determine whether the ith antenna operates.

S1103: Set a load status of a radio frequency input end of the ith antenna and adjust a switch or Tuner state on the ith antenna side when the ith antenna does not operate, so that the ith antenna becomes the auxiliary antenna of the first antenna, where the load status of the radio frequency input end is set to any one of the following: open (Open), broken, isolation (Isolation), or ground (GND).

According to the control method for an antenna system provided in this embodiment of this application, a frequency band in which an antenna of a wireless communication device currently operates is first determined, that is, whether a communication frequency band is a frequency band included in a preset to-be-improved frequency band needs to be determined for regardless of a single-card device or a dual-card device, and whether an ith antenna operates is further determined if the frequency band in which the antenna currently operates belongs to the preset to-be-improved frequency band, and if the ith antenna does not operate, the ith antenna may be used as an auxiliary antenna, that is, the ith antenna is idle in the preset to-be-improved frequency band. Specifically, the controller can set a load status of the ith antenna to implement auxiliary work, where the load status may be adjusted as open, isolation, or ground. Conventionally, there is no technical solution in which the ith antenna is set to the auxiliary antenna. For example, when a first antenna operates, the remaining antennas do not perform any control. Because the ith antenna operates as the auxiliary antenna of the first antenna, that is, a radiator of the ith antenna may be used as a part of a radiator of the first antenna, a volume of the first antenna can be increased, and a bandwidth of the first antenna is increased. In addition, when the ith antenna is used as the auxiliary antenna of the first antenna, the ith antenna becomes a part of the first antenna, and there is no problem of isolation between the first antenna and the ith antenna.

An implementation method in which a wireless communication device includes a single card is described in detail below.

Figure 12:
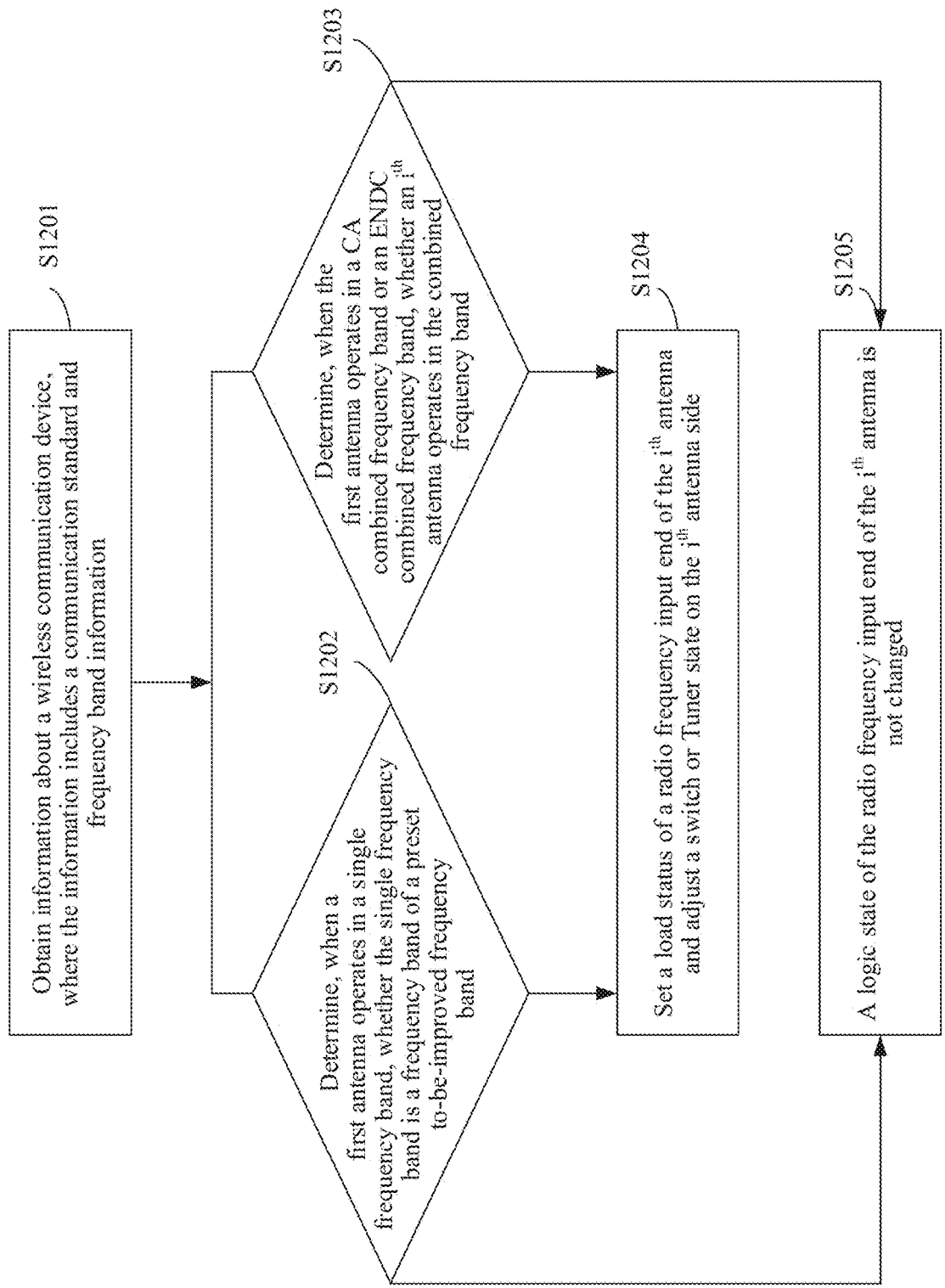
FIG. 12 is a flowchart of another control method for an antenna system according to an embodiment of this application.

FIG. 12 is a flowchart of another control method for an antenna system according to an embodiment of this application.

S1201: Obtain information about a wireless communication device, where the information includes a communication standard (2G to 5G), and if the communication standard is 4G, CA combined frequency band information is obtained; and if the communication standard is 5G, 5G non-standalone (NSA) networking-ENDC combined frequency band information is obtained. In a case of a single frequency band, specific frequency band information is obtained.

S1202: Determine whether the single frequency band is a frequency band of a preset to-be-improved frequency band. If the single frequency band is the frequency band of the preset to-be-improved frequency band, step S1204 is performed; and if the single frequency band is not the frequency band of the preset to-be-improved frequency band, step S1205 is performed.

S1203: Determine, when a first antenna operates in a CA combined frequency band or an ENDC combined frequency band, whether an ith antenna operates in the combined frequency band. If the ith antenna does not operate in the combined frequency band, step S1204 is performed; and if the ith antenna operates in the combined frequency band, step S1205 is performed.

S1204: Set a load status of a radio frequency input end of the ith antenna and adjust a switch or Tuner state on the ith antenna side, so that the ith antenna becomes an auxiliary antenna of the first antenna, where the load status of the radio frequency input end is set to any one of the following: open, isolation, or ground.

S1205: Skip changing a logic state of the radio frequency input end of the ith antenna, that is, skip performing any adjustment on the ith antenna.

An implementation in which a wireless communication device includes a dual card is described in detail below.

Figure 13:
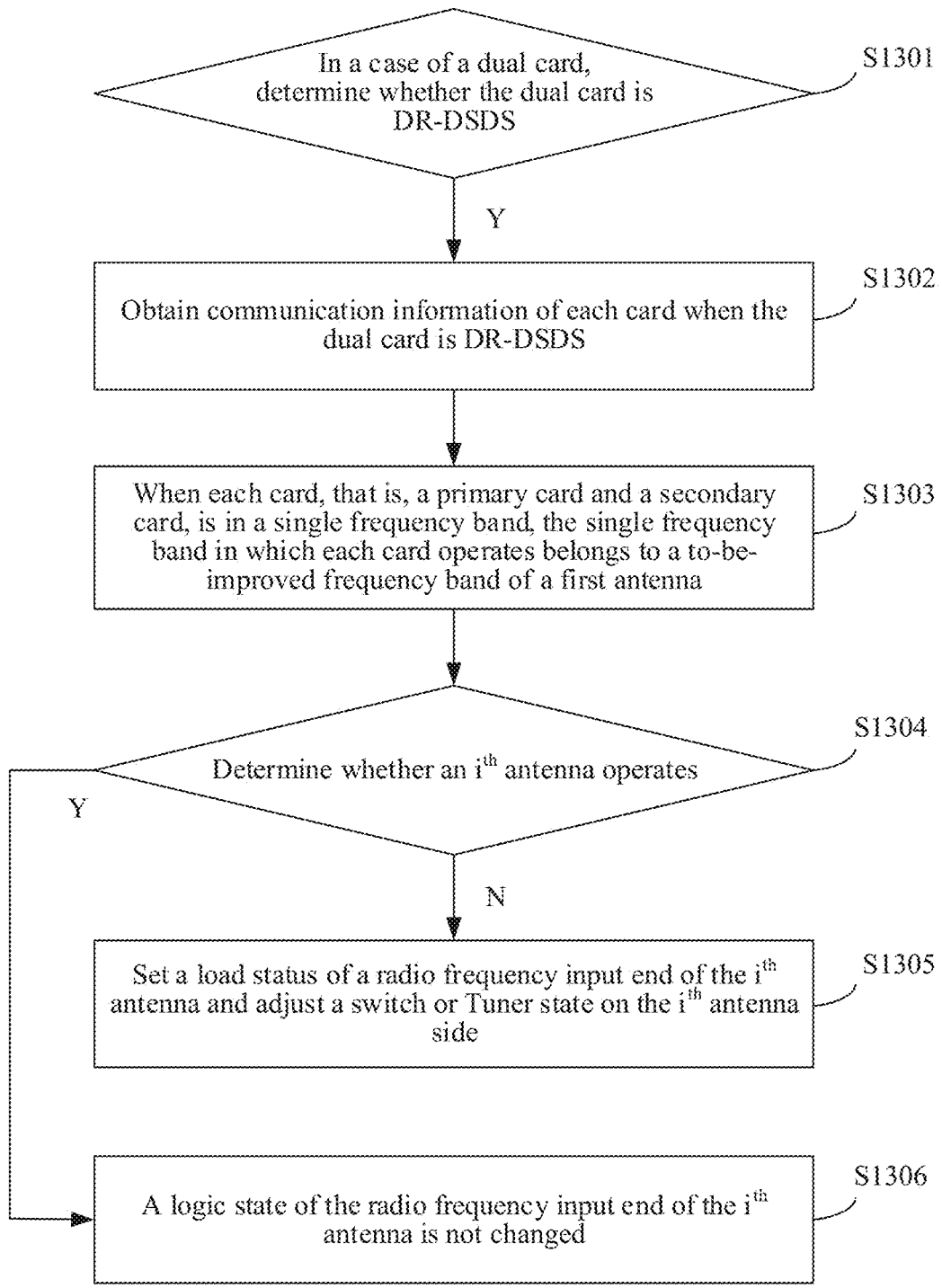
FIG. 13 is a flowchart of another control method for an antenna system according to an embodiment of this application.

FIG. 13 is a flowchart of another control method for an antenna system according to an embodiment of this application.

S1301: Determine, when a wireless communication device includes a dual card, whether the dual card is dual SIM dual active (DSDA) or dual receive dual SIM dual standby (DR-DSDS).

S1302: Obtain communication information of each card when the dual card is the DR-DSDS, where the communication information includes communication standards (2G to 5G), and if the communication standard is 4G, CA combined frequency band information is obtained; and if the communication standard is 5G, NSA-ENDC combined frequency band information is obtained. In a case of a single frequency band, specific frequency band information is obtained.

S1303: When each card, that is, a primary card and a secondary card, is in a single frequency band, the single frequency band in which each card operates belongs to a to-be-improved frequency band of a first antenna. That is, it is determined whether frequency bands in which the primary card and the secondary card operate are the to-be-improved frequency band of the first antenna.

S1304: Determine whether an ith antenna operates, where if the ith antenna does not operate, step S1305 is performed; and if the ith antenna operates, S1306 is performed. That is, if the ith antenna does not operate, the ith antenna can be used as an auxiliary antenna of the first antenna. If the ith antenna operates, the ith antenna cannot be used as the auxiliary antenna.

S1305: Set a load status of a radio frequency input end of the ith antenna and adjust a switch or Tuner state on the ith antenna side, so that the ith antenna becomes an auxiliary antenna of the first antenna, where the load status of the radio frequency input end is set to any one of the following: open, isolation, or ground.

S1306: Skip changing a logic state of the radio frequency input end of the ith antenna, that is, skip performing any adjustment on the ith antenna.

When the wireless communication device includes a single card, the determining that a frequency band in which an antenna of the wireless communication device operates belongs to a preset to-be-improved frequency band specifically includes:

determining that the single card performs communication in a single frequency band; and determining that the single frequency band of the single card of the wireless communication device belongs to one of the preset to-be-improved frequency band.

When the wireless communication device includes a single card, the determining that a frequency band in which an antenna of the wireless communication device operates belongs to a preset to-be-improved frequency band specifically includes:

determining that the single card performs communication in a CA frequency band or an ENDC frequency band, and determining that the $i^{th}$ antenna does not operate in the CA frequency band or the ENDC frequency band; and determining that the CA frequency band or the ENDC frequency band of the single card belongs to the preset to-be-improved frequency band.

When the wireless communication device includes a dual card, the determining that a frequency band in which an antenna of the wireless communication device operates belongs to a preset to-be-improved frequency band specifically includes:

determining, when the dual card is dual receive dual SIM dual standby, that both a primary card and a secondary card of the dual card perform communication in single frequency bands; and determining that both the single frequency band of the primary card and the single frequency band of the secondary card belong to the preset to-be-improved frequency band.

According to the control method for an antenna system provided in the embodiments of this application, the determining whether the $i^{th}$ antenna operates specifically includes: determining a MIMO operating state in a current operating frequency band to determine whether the $i^{th}$ antenna operates, and setting the load status of the radio frequency input end of the $i^{th}$ antenna and adjusting the switch or Tuner state on the $i^{th}$ antenna side when the $i^{th}$ antenna does not operate.

Device Embodiment

Based on the antenna system and the control method provided in the foregoing embodiments, an embodiment of this application further provides a wireless communication device. A detailed description is made below.

The wireless communication device provided in this embodiment of this application includes: the antenna system described in the foregoing embodiments and further includes: a SIM card, where the SIM card is a single card or a dual card; and the SIM card sends and receives signals through the antenna system during communication.

A specific form of the wireless communication device is not specifically limited in the embodiments of this application, for example, may be a communication terminal such as a mobile phone. Because the wireless communication device includes the antenna system described in the foregoing embodiments, the antenna system includes a plurality of antennas. When a first antenna operates, an ith antenna meeting a requirement may be found from the remaining antennas, a load of a radio frequency input end of the ith antenna is set, and then the ith antenna is adjusted as an auxiliary antenna of the first antenna, so that the ith antenna can assist the first antenna in operating and become a parasitic antenna of the first antenna or a part of the first antenna, that is, a volume of the first antenna can be expanded, to improve a bandwidth of the first antenna. Because the ith antenna is the part of the first antenna, there is no problem of isolation between the ith antenna and the first antenna.

It should be understood that, in this application, "at least one" means one or more, and "a plurality of" means two or more. The term "and/or" describes an association between associated objects and represents that three associations may exist. For example, "A and/or B" may indicate that only A exists, only B exists, and both A and B exist, wherein A and B may be singular or plural. The character "/" in this specification generally indicates an "or" relationship between the associated objects. "At least one of the following" or a similar expression thereof refers to any combination of these items, including one item or any combination of more items. For example, at least one of a, b, or c may indicate: a, b, c, "a and b", "a and c", "b and c", or "a, b, and c", where a, b, and c may be singular or plural.

The foregoing embodiments are merely intended for describing the technical solutions of this application, but not for limiting this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions, and these modifications or replacements will not cause the essence of corresponding technical solutions to depart from the spirit and scope of the technical solutions in the embodiments of this application.

What is claimed is:

1. An antenna system, applicable to a wireless communication device, the antenna system comprising:

a radio frequency chip;

a controller; and a plurality of antennas;

wherein the radio frequency chip is connected to the plurality of antennas by a power amplifier and switches;

wherein the plurality of antennas comprises a first antenna and one or more second antennas, and wherein the first antenna is a to-be-improved antenna;

wherein the controller is configured to:

determine that a frequency band in which a given antenna of the one or more second antennas in the wireless communication device operates belongs to a preset to-be-improved frequency band of the first antenna, wherein the preset to-be-improved frequency band comprises at least one frequency band;

determine whether the given antenna of the one or more second antennas is operating;

based on determining that the given antenna of the one or more second antennas is not operating, set a load status of a radio frequency input end of the given antenna; and adjust an antenna tuner of the given antenna of the one or more second antennas to set an operating frequency of the given antenna based on to-be-improved frequency band, so that the given antenna of the one or more second antennas operates as an auxiliary antenna of the first antenna;

wherein the load status of the radio frequency input end of the given antenna is set to any one of the following: open, broken, isolation, or ground; and wherein when the given antenna is operating as an auxiliary antenna of the first antenna, a radiator of the given antenna is used as a part of a radiator of the first antenna, thereby a volume and a bandwidth of the first antenna are increased.

2. The system according to claim 1, wherein the wireless communication device comprises a single card, and wherein the controller determining that the frequency band in which the given antenna of the one or more second antennas in the wireless communication device operates belongs to the preset to-be-improved frequency band comprises:

determining that the single card performs communication in a single frequency band; and determining that the single frequency band of the single card of the wireless communication device belongs to the preset to-be-improved frequency band.

3. The system according to claim 1, wherein the wireless communication device comprises a single card, and wherein the controller determining that the frequency band in which the given antenna of the one or more second antennas in the wireless communication device operates belongs to the preset to-be-improved frequency band comprises:

determining that the single card performs communication in a carrier aggregation (CA) frequency band or an EUTRA NR dual-connectivity (ENDC) frequency band, and determining that the given antenna of the one or more second antennas does not operate in the CA frequency band or the ENDC frequency band; and determining that the CA frequency band or the ENDC frequency band of the single card belongs to the preset to-be-improved frequency band.

4. The system according to claim 1, wherein the wireless communication device comprises a dual card, and wherein the controller determining that the frequency band in which the given antenna of the one or more second antennas in the wireless communication device operates belongs to the preset to-be-improved frequency band comprises:

determining, based on the dual card being dual receive dual SIM dual standby (DR-DSDS), that both a primary card and a secondary card of the dual card perform communication in single frequency bands; and determining that both the single frequency band of the primary card and the single frequency band of the secondary card belong to the preset to-be-improved frequency band.

5. The system according to claim 1, wherein the controller is further configured to:

determine a multiple-input multiple-output (MIMO) operating state in a current operating frequency band to determine whether the given antenna of the one or more second antennas is operating, and set the load status of the radio frequency input end of the given antenna and adjust the antenna tuner of the given antenna based on determining that the second antenna of the one or more second antennas is not operating.

6. A control method for an antenna system applicable to a wireless communication device, wherein the antenna system comprises: a radio frequency chip, a controller, and a plurality of antennas, wherein the radio frequency chip is connected to the plurality of antennas by a power amplifier and switches, wherein the plurality of antennas comprises a first antenna and one or more second antennas, and wherein the first antenna is a to-be-improved antenna, the method comprising:

determining that a frequency band in which a given antenna of the one or more second antennas in the wireless communication device operates belongs to a preset to-be-improved frequency band of the first antenna, wherein the preset to-be-improved frequency band comprises at least one frequency band;

determining whether the given antenna of the one or more second antennas is operating;

based on determining that the given antenna of the one or more second antennas is not operating, setting a load status of a radio frequency input end of the second antenna; and adjusting an antenna tuner of the given antenna of the one or more second antennas to set an operating frequency of the second antenna based on the to-be-improved frequency band, so that the given antenna of the one or more second antennas operates as an auxiliary antenna of the first antenna;

wherein the load status of the radio frequency input end of the given antenna is set to any one of the following: open, isolation, or ground; and wherein when the given antenna is operating as an auxiliary antenna of the first antenna, a radiator of the given antenna is used as a part of a radiator of the first antenna, thereby a volume and a bandwidth of the first antenna are increased.

7. The method according to claim 6, wherein the wireless communication device comprises a single card, and wherein the determining that the frequency band in which the given antenna of the one or more second antennas in the wireless communication device operates belongs to the preset to-be-improved frequency band comprises:

determining that the single card performs communication in a single frequency band; and determining that the single frequency band of the single card of the wireless communication device belongs to the preset to-be-improved frequency band.

8. The method according to claim 6, wherein the wireless communication device comprises a single card, and wherein the determining that the frequency band in which the given antenna of the one or more second antennas in the wireless communication device operates belongs to the preset to-be-improved frequency band comprises:

determining that the single card performs communication in a carrier aggregation (CA) frequency band or an EUTRA NR dual-connectivity (ENDC) frequency band, and determining that the given antenna of the one or more second antennas does not operate in the CA frequency band or the ENDC frequency band; and determining that the CA frequency band or the ENDC frequency band of the single card belongs to the preset to-be-improved frequency band.

9. The method according to claim 6, wherein the wireless communication device comprises a dual card, and wherein the determining that the frequency band in which the given antenna of the one or more second antennas in the wireless communication device operates belongs to the preset to-be-improved frequency band comprises:

determining, based on the dual card being dual receive dual SIM dual standby (DR-DSDS), that both a primary card and a secondary card of the dual card perform communication in single frequency bands; and determining that both the single frequency band of the primary card and the single frequency band of the secondary card belong to the preset to-be-improved frequency band.

10. The method according to claim 6, wherein the determining whether the given antenna of the one or more second antennas is operating comprises:

determining a multiple-input multiple-output (MIMO) operating state in a current operating frequency band to determine whether the given antenna of the one or more second antennas is operating, and setting the load status of the radio frequency input end of the given antenna and adjusting the antenna tuner of the given antenna based on determining that the given antenna of the one or more second antennas is not operating.

11. A wireless communication device, comprising:
an antenna system; and
a SIM card, wherein the SIM card is a single card or a dual card;
wherein the antenna system comprises a radio frequency chip, a controller, and a plurality of antennas;
wherein the radio frequency chip is connected to the plurality of antennas by a power amplifier and switches;
wherein the plurality of antennas comprises a first antenna and one or more second antennas, and wherein the first antenna is a to-be-improved antenna;
wherein the controller is configured to:
determine that a frequency band in which a given antenna of the one or more second antennas in the wireless communication device operates belongs to a preset to-be-improved frequency band of the first antenna, wherein the preset to-be-improved frequency band comprises at least one frequency band;
determine whether the given antenna of the one or more second antennas is operating;
based on determining that the given antenna of the one or more second antennas is not operating, set a load status of a radio frequency input end of the given antenna; and
adjust an antenna tuner of the given antenna of the one or more second antennas to set an operating frequency of the given antenna based on the to-be-improved frequency band, so that the given antenna of the one or more second antennas operates as an auxiliary antenna of the first antenna;
wherein the load status of the radio frequency input end of the given antenna is set to any one of the following: open, broken, isolation, or ground;
wherein when the given antenna is operating as an auxiliary antenna of the first antenna, a radiator of the given antenna is used as a part of a radiator of the first antenna, thereby a volume and a bandwidth of the first antenna are increased; and
wherein the SIM card sends and receives signals through the antenna system during communication.

12. The wireless communication device according to claim 11, wherein the SIM card is a single card, and wherein the controller determining that the frequency band in which the given antenna of the one or more second antennas in the wireless communication device operates belongs to the preset to-be-improved frequency band comprises:

determining that the single card performs communication in a single frequency band; and
determining that the single frequency band of the single card of the wireless communication device belongs to the preset to-be-improved frequency band.

13. The wireless communication device according to claim 11, wherein the SIM card is a single card, and wherein the controller determining that the frequency band in which the given antenna of the one or more second antennas in the wireless communication device operates belongs to the preset to-be-improved frequency band comprises:

determining that the single card performs communication in a carrier aggregation (CA) frequency band or an EUTRA NR dual-connectivity (ENDC) frequency band, and determining that the second antenna of the one or more second antennas does not operate in the CA frequency band or the ENDC frequency band; and
determining that the CA frequency band or the ENDC frequency band of the single card belongs to the preset to-be-improved frequency band.

14. The wireless communication device according to claim 11, wherein the SIM card is a dual card, and wherein the controller determining that the frequency band in which the given antenna of the one or more second antennas in the wireless communication device operates belongs to the preset to-be-improved frequency band comprises:

determining, based on the dual card being dual receive dual SIM dual standby (DR-DSDS), that both a primary card and a secondary card of the dual card perform communication in single frequency bands; and
determining that both the single frequency band of the primary card and the single frequency band of the secondary card belong to the preset to-be-improved frequency band.

15. The wireless communication device according to claim 11, wherein the controller is further configured to:

determine a multiple-input multiple-output (MIMO) operating state in a current operating frequency band to determine whether the given antenna of the one or more second antennas is operating, and set the load status of the radio frequency input end of the given antenna and adjust the antenna tuner of the given antenna based on determining that the given antenna of the one or more second antennas is not operating.

\* \* \* \* \*